US012750920B2

(12) United States Patent
Wang

(10) Patent No.: US 12,750,920 B2
(45) Date of Patent: Sep. 29, 2026

(54) METHOD, DEVICE AND COMPUTER STORAGE MEDIUM OF COMMUNICATION

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 322 days.

(21) Appl. No.: 18/705,265

(22) PCT Filed: Oct. 27, 2021

(86) PCT No.: PCT/CN2021/126595
§ 371 (c)(1),
(2) Date: Apr. 26, 2024

(87) PCT Pub. No.: WO2023/070352
PCT Pub. Date: May 4, 2023

(65) Prior Publication Data
US 2025/0261275 A1 Aug. 14, 2025

(51) Int. Cl.
*H04W 76/28* (2018.01)

(52) U.S. Cl.
CPC .................................. *H04W 76/28* (2018.02)

(58) Field of Classification Search
CPC ............ H04W 76/28; H04W 52/0232; H04W 52/0258; H04W 72/02; H04W 72/30; H04W 72/40
See application file for complete search history.

(56) References Cited

U.S. PATENT DOCUMENTS

| | | | | |
|---|---|---|---|---|
| 2007/0133479 | A1 | 6/2007 | Montojo et al. | |
| 2010/0195605 | A1 | 8/2010 | Suzuki et al. | |
| 2016/0014691 | A1 | 1/2016 | Rastogi | |
| 2017/0339745 | A1 | 11/2017 | Uchino et al. | |
| 2019/0098689 | A1 | 3/2019 | Wei et al. | |
| 2020/0389933 | A1* | 12/2020 | Ang | H04W 76/28 |
| 2023/0047567 | A1* | 2/2023 | Lee | H04W 72/02 |

(Continued)

FOREIGN PATENT DOCUMENTS

| | | | |
|---|---|---|---|
| WO | 2016/158394 | A1 | 10/2016 |
| WO | 2021/097277 | A1 | 5/2021 |
| WO | 2023/283512 | A1 | 1/2023 |

OTHER PUBLICATIONS

JP Office Action for JP Application No. 2024-525207, mailed on Mar. 25, 2025 with English Translation.

(Continued)

*Primary Examiner* — Mahran Y Abu Roumi
(74) *Attorney, Agent, or Firm* — Sughrue Mion, PLLC

(57) ABSTRACT

Embodiments of the present disclosure relate to methods, devices and computer readable media for communication. A terminal device receives a configuration of DRX cycle from a network device and determines a set of starting times for a set of DRX cycles at least based on the configuration of DRX and a SFN period, wherein the SFN period comprises multiple consecutive SFNs. Then the terminal device performs a downlink channel monitoring based on the set of starting times. In this way, a starting time of a DRX cycle may be roughly aligned with arrival time of a packet without accumulated latency, wasted resource, additional signaling overhead and SFN period boundary issue.

14 Claims, 7 Drawing Sheets

(56) References Cited

U.S. PATENT DOCUMENTS

2024/0357552 A1* 10/2024 Jeong ................ H04W 52/0235

OTHER PUBLICATIONS

International Search Report of PCT/CN2021/126595 dated Jul. 27, 2022 [PCT/ISA/210].
Written Opinion of PCT/CN2021/126595 dated Jul. 27, 2022 [PCT/ISA/237].
Extended European Search Report issued Nov. 26, 2024 in European Application No. 21961728.9.
Qualcomm Incorporated et al: "DRX enhancement for XR and CG applications", 3GPP TSG-RAN WG2 Meeting #115-e, Online, Aug. 16-27, 2021, R2-2108850 (Revision of R2-2107221), 6 pages total.
Qualcomm Incorporated et al: "DRX enhancement for XR and CG applications", 3GPP TSG-RAN WG2 Meeting #115-e, Online, Aug. 16-27, 2021, R2-2107221, 4 Pages total.
VIVO: "Potential enhancement areas for XR", 3GPP TSG RAN WG1 #106bis-e, e_Meeting, Oct. 11-19, 2021, R1-2109010, 6 Pages total.

* cited by examiner

METHOD, DEVICE AND COMPUTER STORAGE MEDIUM OF COMMUNICATION

CROSS REFERENCE TO RELATED APPLICATIONS

This application is a National Stage of International Application No. PCT/CN2021/126595 filed on Oct. 27, 2021.

TECHNICAL FIELD

Embodiments of the present disclosure generally relate to the field of telecommunication, and in particular, to methods, devices and computer storage media of communication for discontinuous reception (DRX) configuration.

BACKGROUND

Currently, power saving becomes an important topic for services with periodic packets in terms of control signaling overhead and scheduling latency, especially for an extended reality (XR) service such as virtual reality (VR), augmented reality (AR), cloud gaming, etc.

For both downlink and uplink, a video stream is identified as a key traffic type. Typically, a video stream has 60 or 90 or 120 frames per second (FPS), which means that packets will arrive at radio access network (RAN) every 1/60, 1/90 or 1/120 second. However, a periodicity of a DRX cycle in current specification is an integer number of milliseconds. It is impossible to configure a starting time of a DRX cycle that matches the arrival time of the packets perfectly. Such mismatch between the arrival time of the packets and the starting time of the DRX cycle becomes an issue.

SUMMARY

In general, embodiments of the present disclosure provide methods, devices and computer storage media of communication for DRX configuration.

In a first aspect, there is provided a method of communication. The method comprises: receiving, at a terminal device and from a network device, a configuration of DRX cycle; determining a set of starting times for a set of DRX cycles at least based on the configuration of DRX and a system frame number (SFN) period, wherein the SFN period comprises multiple consecutive SFNs; and performing a downlink channel monitoring based on the set of starting times.

In a second aspect, there is provided a method of communication. The method comprises: receiving, at a terminal device and from a network device, a configuration of DRX cycle; determining, at least based on the configuration of DRX cycle, a set of starting times for a set of DRX cycles, the set of starting times being non-uniform; and performing a downlink channel monitoring based on the set of starting times.

In a third aspect, there is provided a method of communication. The method comprises: transmitting, at a network device and to a terminal device, a configuration of DRX cycle; determining a set of starting times for a set of DRX cycles at least based on the configuration of DRX cycle and a SFN period, wherein the SFN period comprises multiple consecutive SFNs; and performing a downlink transmission based on the set of starting times.

In a fourth aspect, there is provided a method of communication. The method comprises: transmitting, from a network device and to a terminal device, a configuration of DRX cycle; determining, at least based on the configuration of DRX cycle, a set of starting times for a set of DRX cycles, the set of starting times being non-uniform; and performing a downlink transmission based on the set of starting times.

In a fifth aspect, there is provided a device of communication. The device comprises a processor configured to perform the method according to the first or second aspect of the present disclosure.

In a sixth aspect, there is provided a device of communication. The device comprises a processor configured to perform the method according to the third or fourth aspect of the present disclosure.

In a seventh aspect, there is provided a computer readable medium having instructions stored thereon. The instructions, when executed on at least one processor, cause the at least one processor to perform the method according to the first or second aspect of the present disclosure.

In an eighth aspect, there is provided a computer readable medium having instructions stored thereon. The instructions, when executed on at least one processor, cause the at least one processor to perform the method according to the third or fourth aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1A:
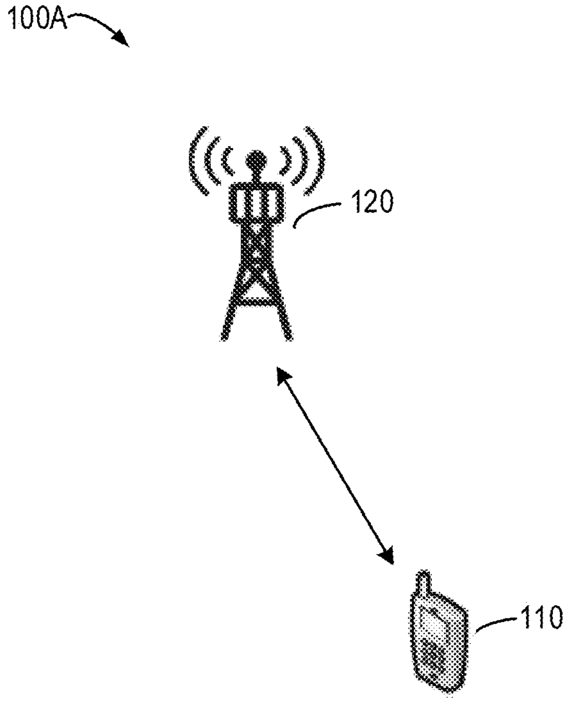
FIG. 1A illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term 'terminal device' refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Ultra-reliable and Low Latency Communications (URLLC) devices, Internet of Everything (IoE) devices, machine type communication (MTC) devices, device on vehicle for V2X communication where X means pedestrian, vehicle, or infrastructure/network, devices for Integrated Access and Backhaul (IAB), Space borne vehicles or Air borne vehicles in Non-terrestrial networks (NTN) including Satellites and High Altitude Platforms (HAPs) encompassing Unmanned Aircraft Systems (UAS), extended Reality (XR) devices including different types of realities such as Augmented Reality (AR), Mixed Reality (MR) and Virtual Reality (VR), the unmanned aerial vehicle (UAV) commonly known as a drone which is an aircraft without any human pilot, devices on high speed train (HST), or image capture devices such as digital cameras, sensors, gaming devices, music storage and playback appliances, or Internet appliances enabling wireless or wired Internet access and browsing and the like. The 'terminal device' can further has 'multicast/broadcast' feature, to support public safety and mission critical, V2X applications, transparent IPv4/IPv6 multicast delivery, IPTV, smart TV, radio services, software delivery over wireless, group communications and IoT applications. It may also incorporated one or multiple Subscriber Identity Module (SIM) as known as Multi-SIM. The term "terminal device" can be used interchangeably with a UE, a mobile station, a subscriber station, a mobile terminal, a user terminal or a wireless device.

The term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), an IAB node, a low power node such as a femto node, a pico node, a reconfigurable intelligent surface (RIS), and the like.

The terminal device or the network device may have Artificial intelligence (AI) or Machine learning capability. It generally includes a model which has been trained from numerous collected data for a specific function, and can be used to predict some information.

The terminal or the network device may work on several frequency ranges, e.g. FR1 (410 MHz to 7125 MHz), FR2 (24.25 GHz to 71 GHz), frequency band larger than 100 GHz as well as Tera Hertz (THz). It can further work on licensed/unlicensed/shared spectrum. The terminal device may have more than one connections with the network devices under Multi-Radio Dual Connectivity (MR-DC) application scenario. The terminal device or the network device can work on full duplex, flexible duplex and cross division duplex modes.

The embodiments of the present disclosure may be performed in test equipment, e.g. signal generator, signal analyzer, spectrum analyzer, network analyzer, test terminal device, test network device, channel emulator.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device or the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

In the context of the present application, the term "symbol" refers to an orthogonal frequency division multiplexing (OFDM) symbol or a discrete Fourier transform spread OFDM (DFT-s-OFDM) symbol. The term "slot" includes multiple consecutive symbols, e.g., 14 symbols, or 12 symbols. The term "mini-slot" includes one or more consecutive symbols, and has less symbol than a slot, e.g., 1, 2, 4, or 7 symbols.

As mentioned above, it is impossible to configure a starting time of a DRX cycle that matches arrival time of packets for some services such as XR service perfectly. To enhance performance of related services, such mismatch between the arrival time of packets and the periodicity of DRX cycle needs to be handled.

Embodiments of the present disclosure provide a solution for solving the above and other potential issues. In the solution, a configuration of DRX cycle is designed so that a set of starting times determined from the configuration are non-uniform, i.e., gaps between starting times of adjacent DRX cycles are non-uniform. This means that there are at least two gaps are different. In this way, a periodicity of DRX cycle may be roughly aligned with arrival time of a packet without accumulated latency, wasted resource and additional signaling overhead.

Embodiments of the present disclosure may be applied to any suitable scenarios. For example, embodiments of the present disclosure may be implemented for XR. Alternatively, embodiments of the present disclosure can be implemented in one of the followings: reduced capability NR devices, NR multiple-input and multiple-output (MIMO), NR sidelink enhancements, NR systems with frequency above 52.6 GHz, an extending NR operation up to 71 GHz, narrow band-Internet of Thing (NB-IOT)/enhanced Machine Type Communication (eMTC) over non-terrestrial networks (NTN), NTN, UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

Principles and implementations of the present disclosure will be described in detail below with reference to the figures.

Example of Communication Network

FIG. 1A illustrates a schematic diagram of an example communication network 100A in which some embodiments of the present disclosure can be implemented. As shown in FIG. 1A, the communication network 100A may include a terminal device 110 and a network device 120. In some embodiments, the terminal device 110 may be served by the network device 120. It is to be understood that the numbers of terminal devices and network devices in FIG. 1 are given for the purpose of illustration without suggesting any limitations to the present disclosure. The communication network 100A may include any suitable number of network devices and/or terminal devices adapted for implementing implementations of the present disclosure.

As shown in FIG. 1A, the terminal device 110 may communicate with the network device 120 via a channel such as a wireless communication channel. The communications in the communication network 100A may conform to any suitable standards including, but not limited to, Global System for Mobile Communications (GSM), Long Term Evolution (LTE), LTE-Evolution, LTE-Advanced (LTE-A), New Radio (NR), Wideband Code Division Multiple Access (WCDMA), Code Division Multiple Access (CDMA), GSM EDGE Radio Access Network (GERAN), Machine Type Communication (MTC) and the like. The embodiments of the present disclosure may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols, 5.5G, 5G-Advanced networks, or the sixth generation (6G) networks.

Figure 1B:
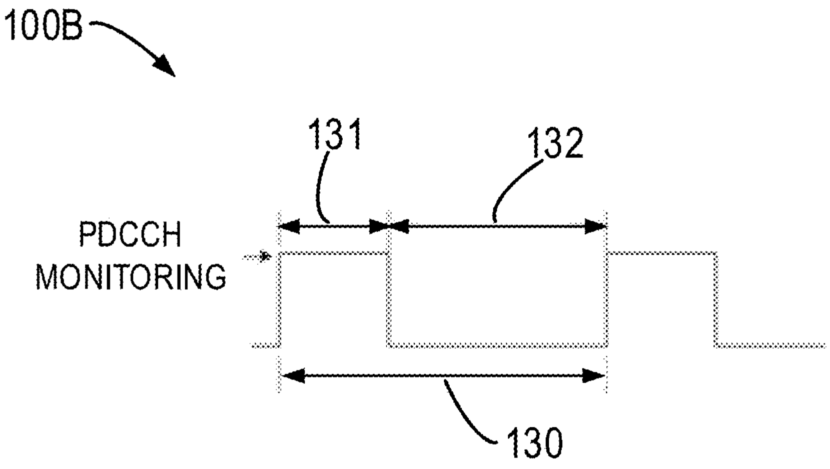
FIG. 1B illustrates a schematic diagram illustrating an example operation in a DRX cycle.

In some embodiments, the network device 120 may transmit a configuration of DRX cycle to the terminal device 110. In this case, the terminal device 110 may perform a downlink channel monitoring based on the configuration of DRX cycle. FIG. 1B illustrates a schematic diagram 100B illustrating an example operation in a DRX cycle. As shown in FIG. 1B, a DRX cycle 130 comprises an active phase 131 (i.e., on duration) and an inactive phase 132 (i.e., an opportunity for DRX). The terminal device 110 performs a downlink channel monitoring such as a PDCCH monitoring only in the active phase 131.

Figure 2:
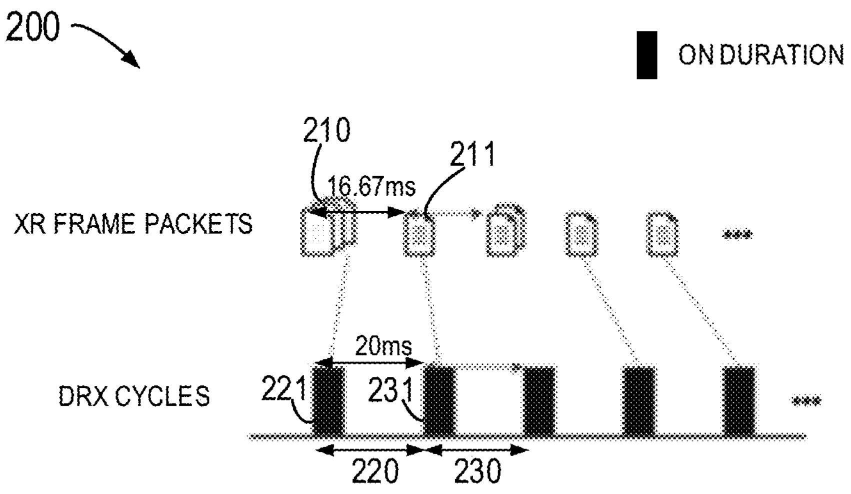
FIG. 2 illustrates a schematic diagram illustrating an example scenario of mismatch between XR frame packets and DRX cycles according to conventional solution.

In some scenarios, a network device may transmit XR frame packets to a terminal device and the terminal device may receive the XR frame packets from the network device. FIG. 2 illustrates a schematic diagram illustrating an example scenario 200 of mismatch between XR frame packets and DRX cycles according to conventional solution. In this example, the XR frame packets comprise XR video stream with 60 FPS. That is, the XR frame packets will roughly arrive at RAN every 1/60 second (i.e., about 16.67 ms). Assuming that a periodicity of DRX cycles is configured as 20 ms. In the context of the present application, a starting time of a DRX cycle refers to a starting time of an active phase (on duration) of the DRX cycle.

As shown in FIG. 2, assuming that an arrival time of XR frame packets 210 aligns with a starting time 221 of a DRX cycle 220 perfectly. As a time interval between the XR frame packets 210 and next XR frame packets 211 is 16.67 ms and a time interval between the starting time 221 of the DRX cycle 220 and a starting time 231 of next DRX cycle 230 is 20 ms, the arrival time of the XR frame packets 211 will mismatch the starting time 231 of the DRX cycle 230. In this example, the starting time 231 of the DRX cycle 230 is later than the arrival time of the XR frame packets 211.

Generally, if a starting time of a DRX cycle is earlier than an arrival time of packets, i.e., an on duration starts before the packet arriving, a terminal device may need to keep awake for a long time to search a downlink control channel such as a PDCCH. Thus, too much power will be wasted. If a starting time of a DRX cycle is later than an arrival time of packets, i.e., an on duration starts after the packet arriving, overall transmission delay of packets will be increased. In addition, some of on durations may be wasted since no packet arrives within or before these on durations.

According to current specification, a DRX cycle is only allowed to be configured as integer number of milliseconds. Thus, the mismatch as described in FIG. 2 still presents. Dynamic adaptation of DRX has been identified to be a potential area for XR, and needs to be further developed.

In view of the above, embodiments of the present disclosure provide a solution for DRX configuration to overcome the above and other potential issues. The DRX configuration is designed so that gaps between starting times of adjacent DRX cycles determined from the DRX configuration are non-uniform. In one aspect, a length of DRX cycle may be configured as a non-integer value. In another aspect, a length of DRX cycle may be configured as an integer value. This will be described in detail with reference to FIGS. 3A to 9.

In the context of the present application, the term "DRX cycle" may refer to a long DRX cycle or a short DRX cycle or both.

Figure 3A:
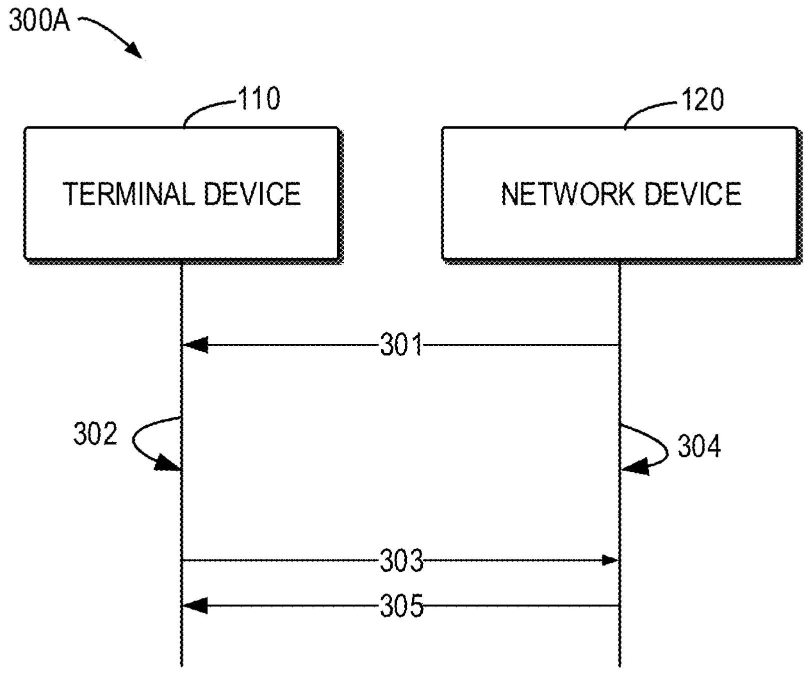
FIG. 3A illustrates a schematic diagram illustrating a process for communication for DRX configuration according to embodiments of the present disclosure.

Example Implementation of Drx Configuration with Non-Integer Drx Cycle Length FIG. 3A illustrates a schematic diagram illustrating a process 300A for communication for resource configuration according to embodiments of the present disclosure. For the purpose of discussion, the process 300A will be described with reference to FIG. 1. The process 300A may involve the terminal device 110 and the network device 120 as illustrated in FIG. 1.

As shown in FIG. 3A, the network device 120 transmits 301, to the terminal device 110, a configuration of DRX cycle. In some embodiments, the configuration may be configured for a long DRX cycle. In some embodiments, the configuration may be configured for a short DRX cycle. In some embodiments, the configuration may be configured for both a long DRX cycle and a short DRX cycle.

In some embodiments, the configuration may indicate at least one of the following: a length of DRX cycle, a start offset for DRX cycle, and a slot offset for DRX cycle. The length of DRX cycle is a non-integer value (also referred to as a nominal DRX cycle length herein). The non-integer value may refer to non-integer number of time units. In the context of the present application, the time unit may be millisecond or subframe or slot or mini-slot or OFDM symbol.

In some embodiments, the terminal device 110 may determine a set of starting times for a set of DRX cycles based on the configuration. In the context of the present application, a starting time of a DRX cycle is the time to start an on-duration timer, wherein the on-duration is the duration at the beginning of a DRX cycle, and the on-duration timer is determined based on RRC information drx-onDurationTimer.

In some embodiments, the terminal device 110 may determine the quotient of an index of time unit and the nominal DRX cycle length, and determine an integer by rounding down the quotient. Then, the terminal device 110 may determine a starting time of DRX cycle based on the determined integer.

For example, the set of starting times may be determined based on equations (1) and (2) below.

$$\text{floor}[Ns - \text{floor}(Ns/p) * p] = \text{drx\_StartOffet} \tag{1}$$

where floor( ) denotes a function of rounding down operation, p denotes the length of DRX cycle, drx_StartOffset denotes the start offset for DRX cycle, and Ns is determined by equation (2):

$$Ns = SFN * 10 + Nsub \tag{2}$$

where SFN denotes a system frame number, and Nsub denotes a subframe number.

For a subframe with an index Ns, if the equation (1) is true, the DRX cycle should be started after drx_SlotOffset (drx_SlotOffset denotes the slot offset for DRX cycle) from the beginning of the subframe. In this way, the set of starting times can be determined. For clarity, an example will be described with reference to FIG. 4A.

Figure 4A:
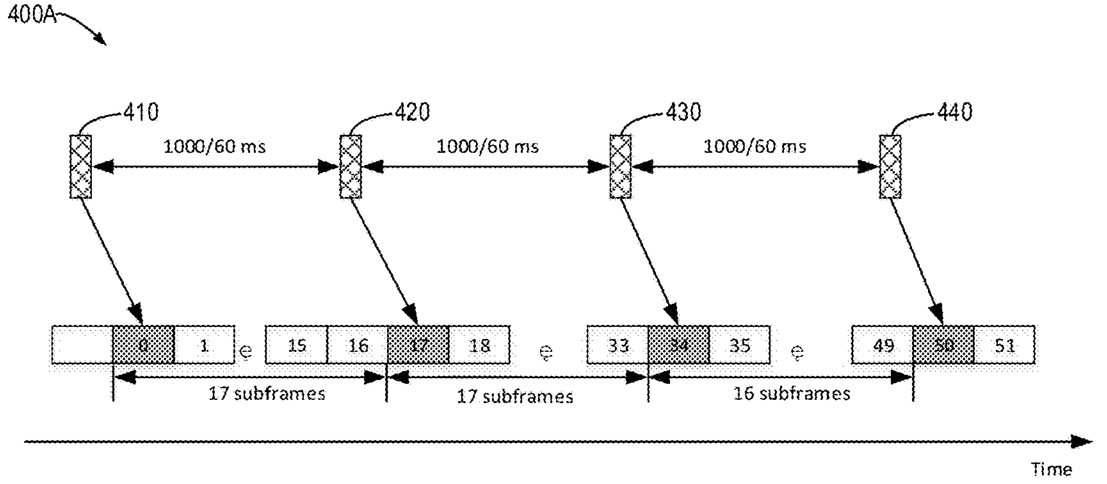
FIG. 4A illustrates a schematic diagram illustrating an example configuration with a positive non-integer DRX cycle length according to embodiments of the present disclosure.

FIG. 4A illustrates a schematic diagram 400A illustrating an example configuration with a positive non-integer DRX cycle length according to embodiments of the present disclosure. In this example, p=1000/60 ms, drx_StartOffset=0, and drx_SlotOffset=0.

As shown in FIG. 4A, assuming that data transmission 410 is the first data transmission within a period and has SFN=0. Based on the equations (1) and (2), a DRX cycle for the data transmission 410 may be determined to be started at subframe 0. After 1000/60 ms, data transmission 420 may arrive. Based on the equations (1) and (2), a DRX cycle for the data transmission 420 may be determined to be started at subframe 17. Similarly, Based on the equations (1) and (2), a DRX cycle for the data transmission 430 may be determined to be started at subframe 34 and a DRX cycle for the data transmission 430 may be determined to be started at subframe 50.

It should be noted that although the starting time of DRX cycle is described in a subframe level in the example of FIG. 4A, the starting time of DRX cycle may also be in any other suitable timing units. For example, the starting time of DRX cycle may be in a symbol or mini-slot level. The present disclosure does not limit this aspect.

It can be seen that the gaps between starting times of DRX cycle for adjacent data transmissions among the data transmissions 410, 420, 430, 440 are 17 subframes, 17 subframes and 16 subframes. The gaps are non-uniform. In this way, a DRX cycle may be roughly aligned with the periodicity of arrival time of a XR packet, and thus additional power consumption due to the misalignment may be avoided. In addition, there is no accumulated offset between DRX cycle and the packet arrival time, and thus it is avoided that the packet arrives at the time outside the on duration of the DRX cycle.

In some embodiments, for short DRX cycle, the equation (1) may be modified as equation (3) below.

$$\text{floor}[Ns - \text{floor}(Ns/p) * p] = \text{floor}[\text{drx\_StartOffset} - \text{floor}(\text{drx\_StartOffset}/p) * p] \tag{3}$$

where floor( ) denotes a function of rounding down operation, p denotes the length of DRX cycle, drx_StartOffset denotes the start offset for DRX cycle, and Ns is determined by the above equation (2).

It is to be understood that each of the equations (1) and (2) may be equivalent to equation (4) below.

$$\text{floor}(Ns \text{ modulo } p) = \text{drx\_StartOffset and floor}(Ns \text{ modulo } p) = \text{floor}(\text{drx\_StartOffset modulo } p) \tag{4}$$

where floor( ) denotes a function of rounding down operation, p denotes the length of DRX cycle, drx_StartOffset denotes the start offset for DRX cycle, Ns is determined by the above equation (2), and modulo denotes a modulo operation for rational numbers. For example, for two rational numbers a and b, a modulo b=a−floor(a/b)*b.

However, upon determination of the set of starting times based on the above embodiments as exemplified by the equations (1)-(4), an issue may occur at a boundary of a SFN period. A SFN period includes multiple consecutive SFNs, e.g., from SFN 0 to SFN 9, or from SFN 100 to SFN 199. In the context of the present application, the term "SFN period" may refer to a time duration from SFN 0 to SFN 1023. The SFN period equals to 10.24 seconds (10240 ms) or 10240 subframes. After SFN 1023, the SFN period repeats from SFN 0 to SFN 1023.

Obviously, the duration of a SFN period (i.e., 10240 ms) is not an integer multiple of the nominal DRX cycle length, even for some integer DRX cycle lengths, e.g., 3 ms, 7 ms, or 17 ms. Thus, there may be not enough subframes left for the last DRX cycle in a SFN period. For clarity, an example is described in connection with FIG. 4B.

Figure 4B:
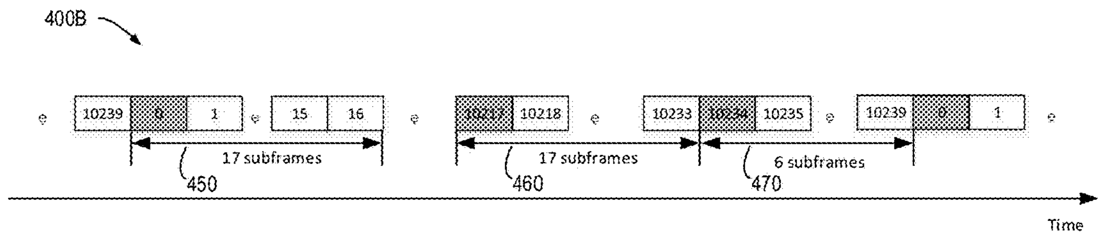
FIG. 4B illustrates a schematic diagram illustrating an example scenario in the example configuration of FIG. 4A.

FIG. 4B illustrates a schematic diagram illustrating an example scenario 400B in the example configuration of FIG. 4A. Assuming that a set of starting times are determined based on the equations (1) and (2). As shown in FIG. 4B, a DRX cycle 450 may be determined to be started at subframe 0 and last 17 subframes, and a DRX cycle 460 may be determined to be started at subframe 10217 and last 17 subframes. In similar way, the last DRX cycle may be determined to be started at subframe 10234 and last 16 subframes. However, in fact, there are only 6 subframes left for this SFN period, as shown in FIG. 4B. That is, a DRX cycle 470 is started at subframe 10234 but only 6 subframes are actually available. Furthermore, the next DRX cycle will start at SFN 0 of next SFN period. Thus, there will be not enough subframes for the last DRX cycle in a SFN period.

To solve the above issue, embodiments of the present disclosure provide an improved solution for determining a starting time of a DRX cycle. In the solution, upon reception of the configuration, the terminal device 110 determines 302 a set of starting times for a set of DRX cycles at least based on the configuration of DRX cycle and the SFN period. In this way, such situation where there will be not enough subframes for the last DRX cycle in a SFN period is avoided.

In some embodiments, the terminal device 110 may consider at least one of the following conditions of the SFN period for determination of the set of starting times: whether the SFN period is ended; whether the SFN period is started; whether the SFN is 1023; whether the SFN is 0; whether the SFN changes from 1023 to 0; or the index of the SFN period. Of course, any other suitable conditions of the SFN period are also feasible.

For illustration, some example embodiments will be described in connection with Embodiments 1 and 2.

Embodiment 1

In this embodiment, the definition of Ns in the above equation (1) is modified so as to avoid the situation where there will be no enough subframes for the last DRX cycle in a SFN period.

In some embodiments, the terminal device 110 may determine Ns (also referred to as a first value herein) based on an index of a SFN period, a SFN and a subframe number associated with a DRX cycle. For example, Ns may be modified as being determined by equation (5) below.

$$Ns = (\mathrm{Np} * 1024 + SFN) * 10 + Nsub \quad (5)$$

where SFN denotes a system frame number, Nsub denotes a subframe number, and Np denotes a value of a counter for SFN periods (may also referred to as an index of a SFN period herein).

In some embodiments, Np starts from 0 after the DRX is configured and Np increases by 1 when a SFN period ends or a SFN period starts (in other words, at the end of SFN 1023 or at the beginning of SFN 0). In some embodiments, in response to receiving a medium access control (MAC) control element (CE) or downlink control information (DCI) from the network device 120 to activate or modify a DRX configuration, the terminal device 110 may set or reset Np to be 0.

Based on the equation (1) and (5), the terminal device 110 may determine a starting time for the DRX cycle.

Embodiment 2

In this embodiment, drx_StartOffset in the above equation (1) is modified so as to avoid the situation where there will be no enough subframes for the last DRX cycle in a SFN period. That is, a start offset for DRX cycle may be adjusted.

In some embodiments, when a SFN period starts (i.e., when the first SFN in the SFN period starts), the terminal device 110 may adjust the start offset for DRX cycle based on the length of DRX cycle and a value (for convenience, also referred to as a second value and denoted as delta herein) used for adjusting the start offset for DRX cycle. Alternatively, when a SFN period ends (i.e., when the last SFN in the SFN period ends), the terminal device 110 may adjust the start offset for DRX cycle based on the length of DRX cycle and the second value.

In some embodiments, if a SFN period starts or ends before a DRX cycle, the terminal device 110 may apply the second value starting from the DRX cycle to adjust the start offset for DRX cycle. In some embodiments, if a SFN period starts or ends within the last DRX cycle in the previous SFN period, the terminal device 110 may apply the second value starting from this DRX cycle to adjust the start offset for DRX cycle. For illustration, some example embodiments are described below on the adjustment of the start offset and the determination of the second value.

In some embodiments, drx_StartOffset may be updated based on equation (6) below.

$$\mathrm{updated\_drx\_StartOffset} = (\mathrm{drx\_StartOffset} + \mathrm{delta})\ \mathrm{modulo}\ p1 \quad (6)$$

where updated_drx_StartOffset denotes updated drx_StartOffset, delta denotes the second value, modulo denotes a modulo operation, and p1 is determined by equation (7) below:

$$p1 = \mathrm{ceil}(p)\ \mathrm{or}\ \mathrm{floor}(p) \quad (7)$$

where ceil( ) denotes a function of rounding up operation, floor( ) denotes a function of rounding down operation, and p denotes the length of DRX cycle.

In some embodiments, drx_StartOffset may be updated based on equation (8) below.

$$\mathrm{updated\_drx\_StartOffset} = \mathrm{floor}[(\mathrm{drx\_StartOffset} + \mathrm{delta})\ \mathrm{modulo}\ p] \quad (8)$$

where updated_drx_StartOffset denotes updated drx_StartOffset, delta denotes the second value, floor( ) denotes a function of rounding down operation, modulo denotes a modulo operation for rational numbers, and p denotes the length of DRX cycle.

In some embodiments, drx_StartOffset may be updated based on equation (9) below.

$$\mathrm{updated\_drx\_StartOffset} = \mathrm{ceil}[(\mathrm{drx\_StartOffset} + \mathrm{delta})\ \mathrm{modulo}\ p] \quad (9)$$

where updated_drx_StartOffset denotes updated drx_StartOffset, delta denotes the second value, ceil( ) denotes a function of rounding up operation, modulo denotes a modulo operation for rational numbers, and p denotes the length of DRX cycle.

It is to be understood that the equations (6)-(9) are merely examples for illustration, and the start offset of DRX cycle may be adjusted based on the second value in any other suitable ways.

In some embodiments, the second value may be determined by the terminal device 110. In some embodiments, the terminal device 110 may determine the second value based on the length of DRX cycle. For example, the terminal device 110 may determine the second value based on equation (10) below.

$$\text{delta} = \text{floor}[\text{ceil}(10240/p)*p-10240] \text{ or } \text{floor}[\text{ceil}(10240/p)*p]-10240 \quad (10)$$

where delta denotes the second value, floor( ) denotes a function of rounding down operation, ceil( ) denotes a function of rounding up operation, and p denotes the length of DRX cycle.

As another example, the terminal device 110 may determine the second value based on equation (11) below.

$$\text{delta} = \text{ceil}[\text{ceil}(10240/p)*p-10240] \text{ or } \text{ceil}[\text{ceil}(10240/p)*p]-10240 \quad (11)$$

where delta denotes the second value, ceil( ) denotes a function of rounding up operation, and p denotes the length of DRX cycle.

In some embodiments, the second value may be determined by the network device 120. In some embodiments, the terminal device 110 may receive a configuration of the second value from the network device 120, and determine the second value based on the configuration of the second value. In some embodiments, the network device 120 may transmit the configuration to the terminal device 110 via a RRC signaling. In some embodiments, the network device 120 may transmit the configuration to the terminal device 110 via a MAC CE. In some embodiments, the network device 120 may transmit the configuration to the terminal device 110 via DCI. It is to be understood that any other suitable ways are also feasible for transmission of the configuration.

In some embodiments, a starting time of a DRX cycle to be adjusted may be later than a threshold time after the reception of the configuration of the second value. In some embodiments, the second value may be applied starting from the current DRX cycle or the next DRX cycle. In some embodiments, the second value may be applied after the threshold time. In some embodiments, the second value may be applied starting from the beginning of the next SFN period.

In some embodiments, a starting time of a DRX cycle to be adjusted may be the first DRX cycle in the current SFN period. In some embodiments, the first DRX cycle in the current SFN period may be the first complete DRX cycle in the current SFN period (i.e., the entire on duration and inactive duration of the DRX cycle are within the current SFN period). In some embodiments, the first DRX cycle in the current SFN period may be the first DRX cycle which is started in the current SFN period. In some embodiments, the first DRX cycle in the current SFN period may be the first DRX cycle which is started in the previous SFN period and ended in the current SFN period.

Return to FIG. 3A, upon determination of the set of starting times, the terminal device 110 performs 303 a downlink channel monitoring based on the set of starting times. For example, the terminal device 110 will start PDCCH monitoring at the set of starting times.

Similarly, upon transmission of the DRX configuration, the network device 120 also determines 304 the set of starting times for the set of DRX cycles. The operations for the determination 304 are similar with the operations for the determination 302, and thus are not repeated here for concise. Upon determination of the set of starting times, the network device 120 performs 305 a downlink channel transmission.

With the process of FIG. 3A, a DRX cycle may be roughly aligned with the periodicity of arrival time of a XR packet, and thus additional power consumption due to the misalignment may be avoided. No accumulated offset between DRX cycle and the packet arrival time, and thus it is avoided that the packet arrives at the time outside the on duration of the DRX cycle. Meanwhile, the above SFN period boundary issue is overcome.

Example Implementation of Drx Configuration with Integer Drx Cycle Length

Figure 3B:
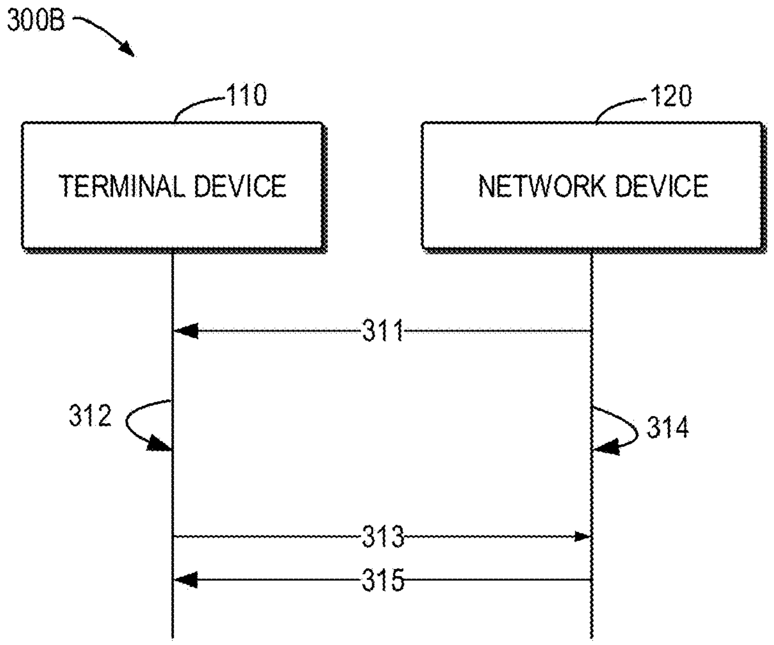
FIG. 3B illustrates a schematic diagram illustrating another process for communication for DRX configuration according to embodiments of the present disclosure.

FIG. 3B illustrates a schematic diagram illustrating a process 300B for communication for resource configuration according to embodiments of the present disclosure. For the purpose of discussion, the process 300B will be described with reference to FIG. 1. The process 300B may involve the terminal device 110 and the network device 120 as illustrated in FIG. 1.

As shown in FIG. 3B, the network device 120 transmits 311, to the terminal device 110, a configuration of DRX cycle. In some embodiments, the configuration may be configured for a long DRX cycle. In some embodiments, the configuration may be configured for a short DRX cycle. In some embodiments, the configuration may be configured for both a long DRX cycle and a short DRX cycle.

In some embodiments, the configuration may indicate at least one of the following: a length of DRX cycle, a start offset for DRX cycle, and a slot offset for DRX cycle. The length of DRX cycle is an integer value. The integer value may refer to integer number of time units. As mentioned above, the time unit may be millisecond or subframe or slot or mini-slot or OFDM symbol in the context of the present disclosure.

Upon reception of the configuration, the terminal device 110 determines 312 a set of starting times for a set of DRX cycles at least based on the configuration so that the set of starting times is non-uniform. In this way, a DRX cycle may be roughly aligned with the periodicity of arrival time of a XR packet, and thus additional power consumption due to the misalignment may be avoided. For clarity, some example embodiments for determination of the set of starting times will be detailed in connection with Embodiments 3-7.

Embodiment 3

In this embodiment, the terminal device 110 may adjust a starting time of a DRX cycle based on an indication from the network device 120. In other words, an offset to be made is indicated from the network device 120 to the terminal device 110. In this way, a computing complexity at the terminal device 110 may be reduced.

In some embodiments, the terminal device 110 may receive an indication (for convenience, also referred to as a first indication herein) indicating that one or more starting times of one or more DRX cycles in the set of DRX cycles are to be modified.

In some embodiments, the terminal device 110 may determine, based on the configuration, the candidate set of starting times for the set of DRX cycles. For example, for a short DRX cycle, the terminal device 110 may determine the candidate set of starting times based on equation (12) below.

$$[(SFN\times 10)+Nsub] \text{ modulo } (drx-ShortCycle)=(drx-StartOffset) \text{ modulo } (drx-ShortCycle) \tag{12}$$

where SFN denotes a system frame number, Nsub denotes a subframe number, drx-ShortCycle denotes a length of the short DRX cycle, drx-StartOffset denotes a start offset for DRX cycle, and modulo denotes a modulo operation. For a subframe with an index [(SFN×10)+Nsub], if the equation (12) is true, the short DRX cycle should be started after drx_SlotOffset from the beginning of the subframe.

For a long DRX cycle, the terminal device 110 may determine the candidate set of starting times based on equation (13) below.

$$[(SFN\times 10)+Nsub] \text{ modulo } (drx-LongCycle)=drx-StartOffset \tag{13}$$

where SFN denotes a system frame number, Nsub denotes a subframe number, drx-LongCycle denotes a length of the long DRX cycle, drx-StartOffset denotes a start offset for DRX cycle, and modulo denotes a modulo operation. For a subframe with an index [(SFN×10)+Nsub], if the equation (13) is true, the long DRX cycle should be started after drx_SlotOffset from the beginning of the subframe.

The terminal device 110 may modify the one or more starting times in the candidate set of starting times based on the first indication, and determine the modified candidate set of starting times as the set of starting times. In some embodiments, the first indication may comprise an offset with respect to the one or more starting times. In some embodiments, the offset may be applied to adjust the length of DRX cycle. In some embodiments, the offset may be applied to adjust the start offset for DRX cycle. For example, the network device 120 may indicate the terminal device 110 to start the current or next DRX cycle at 16 ms after the candidate starting time of the previous DRX cycle. It is to be understood that the offset may be any suitable values. It is also to be understood that the first indication may adopt any other suitable forms.

Embodiment 4

In this embodiment, the terminal device 110 may calculate an offset to be made on a starting time of DRX cycle by itself. In this way, signaling overhead may be saved.

In some embodiments, the terminal device 110 may determine, based on the configuration, a candidate set of starting times for the set of DRX cycles. For example, the terminal device 110 may determine the candidate set of starting times based on the equation (12) or (13).

Then the terminal device 110 may determine an accumulated offset for a DRX cycle in the set of DRX cycles based on an index of the DRX cycle, the length of the DRX cycle and a time value associated with the configuration of DRX cycle. In some embodiments, the terminal device 110 may the accumulated offset based on equation (14) below.

$$Oa=N*(P-T) \tag{14}$$

where Oa denotes the accumulated offset, N denotes an index of a DRX cycle, T denotes the time value, and P denotes a length of DRX cycle. T is a non-integer value.

In some embodiments, the time value and the configuration of DRX cycle may be indicated by the same RRC information. In some embodiments, the time value may be associated with an identity of the configuration of DRX cycle. In some embodiments, the configuration of DRX cycle may be associated with an identity of the time value. In some embodiments, the time value and the configuration of DRX cycle may be associated with the same traffic.

In some embodiments, the time value may be preconfigured or predefined. In some embodiments, the time value may be a periodicity of the traffic. Of course, the time value may also be any other suitable values or parameters associated with the traffic. In some embodiments, the network device 120 may indicate the time value to the terminal device 110 via an indication (for convenience, also referred to as a second indication herein). In some embodiments, the second indication may be a RRC configuration. In some embodiments, the second indication may be a MAC CE. In some embodiments, the second indication may be DCI.

Based on the accumulated offset, the terminal device 110 may modify a starting time of the DRX cycle in the candidate set of starting times. In some embodiments, if the accumulated offset is smaller than a threshold offset (denoted as Th), the terminal device 110 may keep the starting time of the DRX cycle unchanged. In some embodiments, if the accumulated offset is larger than the threshold offset Th, the terminal device 110 may modify the starting time based on the threshold offset Th. In some embodiments, if the accumulated offset is larger than an integer multiple of the threshold offset Th, the terminal device 110 may modify the starting time based on the integer multiple of the threshold offset Th.

In some embodiments, the threshold offset Th may be applied to adjust the length of DRX cycle. In some alternative embodiments, the threshold offset Th may be applied to adjust the start offset for DRX cycle. In this way, the terminal device 110 may modify the starting time based on the threshold offset Th.

In some embodiments, if the accumulated offset is equal to the threshold offset Th, the terminal device 110 may modify the starting time based on the threshold offset Th. In some alternative embodiments, if the accumulated offset is equal to the threshold offset Th, the terminal device 110 may keep the starting time of the DRX cycle unchanged.

In some embodiments, the threshold offset Th may be preconfigured or predefined. In some embodiments, the network device 120 may indicate the threshold offset Th to the terminal device 110 via an indication (for convenience, also referred to as a third indication herein). In some embodiments, the third indication may be a RRC configuration. In some embodiments, the third indication may be a MAC CE. In some embodiments, the third indication may be DCI. In some embodiments, if the terminal device 110 does not receive the third indication, the threshold offset Th may equal to a default value. In some embodiments, the default value may be 1 ms, 1 subframe, 1 slot, 1 mini-slot or 1 frame. In some embodiments, the default value may be indicated by a RRC configuration.

In some embodiments, the terminal device 110 may reset a counter to be zero after the modifying, the counter being configured for generating the index of the DRX cycle. In other words, N in the equation (14) is reset to 0 after the modifying (i.e., after the accumulated offset is compensated).

Then the terminal device 110 may determine the modified candidate set of starting times as the set of starting times. In this way, the accumulated delay is efficiently compensated in a simple and timely manner.

Figure 5:
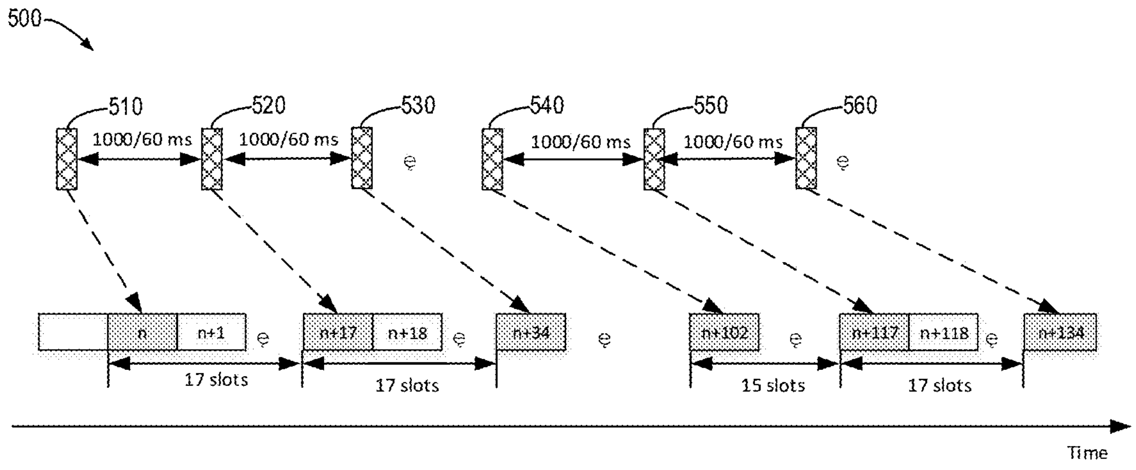
FIG. 5 illustrates a schematic diagram illustrating an example configuration with a positive integer DRX cycle length according to embodiments of the present disclosure.

For illustration, an example is described below with reference to FIG. 5. FIG. 5 illustrates a schematic diagram 500 illustrating an example configuration with a positive integer DRX cycle length according to embodiments of the present disclosure. In this example, the length of DRX cycle (i.e., P) is 17 ms, the time value (i.e., T) is 1000/60 ms, and the threshold offset (i.e., Th) is 2 ms.

As shown in FIG. 5, assuming that data transmission 510 is the first data transmission within a period. Based on the equation (12) or (13), a DRX cycle for the data transmission 410 may be determined to be started at slot n. An index of a DRX cycle corresponding to the data transmission 510 is 0, i.e., N=0. Based on the equation (14), it can be known that Oa=0 ms. As Th=2 ms, Oa<Th. In this case, a starting time of the DRX cycle corresponding to the data transmission 510 is unchanged.

Based on the equation (12) or (13), a DRX cycle for the data transmission 520 may be determined to be started at slot n+17. An index of a DRX cycle corresponding to the data transmission 520 is 1, i.e., N=1. Based on the equation (14), it can be known that Oa=0.33 ms. As Th=2 ms, Oa<Th. In this case, a starting time of the DRX cycle corresponding to the data transmission 520 is unchanged.

Based on the equation (12) or (13), a DRX cycle for the data transmission 530 may be determined to be started at slot n+34. An index of a DRX cycle corresponding to the data transmission 530 is 2, i.e., N=2. Based on the equation (14), it can be known that Oa=0.67 ms. As Th=2 ms, Oa<Th. In this case, a starting time of the DRX cycle corresponding to the data transmission 530 is unchanged.

Based on the equation (12) or (13), a DRX cycle for the data transmission 540 may be determined to be started at slot n+102. An index of a DRX cycle corresponding to the data transmission 540 is 6, i.e., N=6. Based on the equation (14), it can be known that Oa=2 ms. As Th=2 ms, Oa<Th. In this case, a starting time of the DRX cycle corresponding to the data transmission 540 is unchanged.

Based on the equation (12) or (13), a DRX cycle for the data transmission 550 may be determined to be started at slot n+117. An index of a DRX cycle corresponding to the data transmission 550 is 7, i.e., N=7. Based on the equation (14), it can be known that Oa=2.33 ms. As Th=2 ms, Oa>Th. In this case, a starting time of the DRX cycle corresponding to the data transmission 550 should be adjusted based on Th. For example, the length of DRX cycle is adjusted as P+Th. Based on the equation (12) or (13) with P'=P+Th, a DRX cycle for the data transmission 550 may be adjusted to be started at slot n+119. Accordingly, N is reset to be 0.

Based on the equation (12) or (13), a DRX cycle for the data transmission 560 may be determined to be started at slot n+134. An index of a DRX cycle corresponding to the data transmission 540 is 0, i.e., N=0. Based on the equation (14), it can be known that Oa=0.33 ms. As Th=2 ms, Oa<Th. In this case, a starting time of the DRX cycle corresponding to the data transmission 560 is unchanged.

It should be noted that although the starting time is described in connection with slot offset in the example of FIG. 5, the starting time may also be in any other suitable timing units. For example, the starting time may be an offset in a symbol, mini-slot or subframe level. The present disclosure does not limit this aspect.

It is to be noted that the example described in FIG. 5 is merely for illustration, and not for limitation. Any other suitable ways are also feasible.

Embodiment 5

In this embodiment, the network device 120 may transmit, to the terminal device 110, information of a DRX cycle pattern for DRX configuration. In some embodiments, the information of the DRX cycle pattern may be the timing pattern per se. In some embodiments, the network device 120 may obtain the DRX cycle pattern from the information.

In some embodiments, the DRX configuration may indicate a start offset for DRX cycle and a DRX cycle pattern for the set of starting times. The DRX cycle pattern may comprise a set of values, a value in the set of values indicating a length of DRX cycle. In some embodiments, the unit of the value in the set of values may be one millisecond, one symbol, one mini-slot, or one slot.

In some embodiments, the DRX cycle pattern may comprise K1 integer numbers and K1 may be an integer number larger than 1. In some embodiments, the DRX cycle pattern may be (34, 33, 33), (17, 17, 16), (12, 11, 11, 11, 11, 11, 11, 11, 11) or (9, 8, 8). For example, the DRX cycle pattern may be determined based on FPS of XR traffic. For 30 FPS, the DRX cycle pattern may be (34, 33, 33). For 60 FPS, the timing pattern may be (17, 17, 16). For 90 FPS, the DRX cycle pattern may be (12, 11, 11, 11, 11, 11, 11, 11, 11). For 120 FPS, the DRX cycle pattern may be (9, 8, 8). In some embodiments, the value of K1 may be associated with FPS, for example, for 30 FPS, 60 FPS, or 120 FPS, K1 is 3, and for 90 FPS, K1 is 9. In some embodiments, the sum of the K1 integer numbers may be one of 100, 50 and 25. In some embodiments, the sum of the K1 integer numbers may be associated with the FPS, for example, for 30 FPS or 90 FPS, the sum of the K1 integer numbers is 100, for 60 FPS, the sum of the K1 integer numbers is 50, and for 120 FPS, the sum of the K1 integer numbers is 25. In some embodiments, the difference between any two elements in the DRX cycle pattern may be 0, 1, or 2.

In some embodiments, the terminal device 110 may determine a value (for convenience, also referred to as a third value herein) in the set of values based on an index of the DRX cycle and the number of values in the set of values. For example, the terminal device 110 may determine a value in the set of values based on equation (15) below.

$$k=(N \text{ modulo } M) \tag{15}$$

where modulo denotes a modulo operation, and k denotes an index of the value in the set and k=0, 1, 2, . . . , M−1. N denotes an index of a DRX cycle and N>=0. M denotes the number of values in the set.

In some alternative embodiments, the terminal device 110 may determine a value in the set of values based on an index of a subframe number associated with the DRX cycle, the length of the DRX cycle and the number of values in the set of values. For example, the terminal device 110 may determine a value in the set of values based on equation (16) below.

$$k=[\text{floor}(Ns/P)\ \text{modulo}\ M] \tag{16}$$

where floor( ) denotes a function of rounding down operation, P denotes a length of DRX cycle, modulo denotes a modulo operation, and k denotes an index of the value in the set and k=0, 1, 2, . . . , M−1. M denotes the number of values in the set. Ns is determined by the above equation (2) or (5).

It is to be understood that the equation (15) is merely an example, and any other suitable ways are also feasible for determination of a value in the set.

Then the terminal device 110 may determine the starting time for the DRX cycle based on the determined value, the start offset for the DRX cycle, a SFN and a subframe number associated with the DRX cycle. For example, the terminal device 110 may determine the starting time for the DRX cycle based on the equation (12) or (13).

It is to be understood that the DRX cycle pattern may be repeatedly used.

In this way, a starting time of DRX cycle may be roughly aligned with arrival time of a packet without accumulated latency, wasted resource and additional signaling overhead.

Embodiment 6

In this embodiment, the network device 120 may transmit, to the terminal device 110, information of a start offset pattern for DRX configuration. In some embodiments, the information of the start offset pattern may be the timing pattern per se. In some embodiments, the network device 120 may obtain the start offset pattern from the information.

In some embodiments, the DRX configuration may indicate a length of DRX cycle and a start offset pattern for the set of starting times. The length of DRX cycle is an integer value. The start offset pattern comprises a set of values, a value in the set of values indicating a start offset for DRX cycle. In some embodiments, the unit of the value in the set of values may be one millisecond, one symbol, one mini-slot, or one slot.

In some embodiments, the start offset pattern may comprise K1 integer numbers and K1 may be an integer number larger than 1. For example, the start offset pattern may be determined as (1, 1, 0). Any other suitable forms may also be adopted.

In some embodiments, the terminal device 110 may determine a value (for convenience, also referred to as a fourth value herein) in the set of values based on an index of a subframe number associated with the DRX cycle, the length of the DRX cycle and the number of values in the set of values. For example, the terminal device 110 may determine a value in the set of values based on the above equation (16).

In some alternative embodiments, the terminal device 110 may determine the second value in the set of values based on the above equation (15). It is to be understood that any other suitable ways are also feasible for determination of a value in the set for start offset pattern.

Then the terminal device 110 may determine the starting time for the DRX cycle based on the determined value, the length of the DRX cycle, a SFN and the subframe number associated with the DRX cycle. For example, the terminal device 110 may determine the starting time for the DRX cycle based on the equation (12) or (13).

It is to be understood that the start offset pattern may be repeatedly used.

In this way, a starting time of DRX cycle may also be roughly aligned with arrival time of a packet without accumulated latency, wasted resource and additional signaling overhead.

Embodiment 7

In this embodiment, an equation (such as the equation (12) or (13)) for determination of a starting time of a DRX cycle is re-designed by introducing an index of DRX cycle.

In this embodiment, the DRX configuration may indicate a length of DRX cycle, a start offset for DRX cycle and a slot offset of DRX cycle. In some embodiments, the length of DRX cycle may be an integer value. In some embodiments, the length of DRX cycle may be a non-integer value. That is, Embodiment 7 may be applied in case of an integer DRX cycle length, and also may be applied in case of a non-integer DRX cycle length.

In some embodiments, the terminal device 110 may determine a starting time of a DRX cycle based on a reference system frame number (SFN), the length, the start offset, the slot offset, an index of the DRX cycle, a SFN and a subframe number associated with the DRX cycle. For example, the terminal device 110 may determine the starting time based on equation (17) below.

$$Ns=[S1*10+\text{floor}(N*P)+\text{drx\_StartOffset}]\ \text{modulo}\ 10240 \tag{17}$$

where S1 denotes the reference SFN, floor( ) denotes a function of rounding down operation, N denotes an index of DRX cycle, P denotes the length of DRX cycle, drx_StartOffset denotes the start offset for DRX cycle, and Ns is determined by the above equation (2). For the Nth DRX cycle, if the equation (17) is true, then the DRX cycle should be started after drx_SlotOffset from the beginning of the subframe.

In some embodiments, the terminal device 110 may determine a starting time of a DRX cycle based on a reference subframe number, the length, the start offset, the slot offset, an index of the DRX cycle, a SFN and a subframe number associated with the DRX cycle. For example, the terminal device 110 may determine the starting time based on equation (18) below.

$$Ns=[S2+\text{floor}(N*P)+\text{drx\_StartOffset}]\ \text{modulo}\ 10240 \tag{18}$$

where S2 denotes the reference subframe number, floor( ) denotes a function of rounding down operation, N denotes an index of DRX cycle, P denotes the length of DRX cycle, drx_StartOffset denotes the start offset for DRX cycle, and Ns is determined by the above equation (2). For the Nth DRX cycle, if the equation (18) is true, then the DRX cycle should be started after drx_SlotOffset from the beginning of the subframe.

In some embodiments, the terminal device 110 may receive information of the reference SFN from the network device 120 and determine the reference SFN based on the received information. In some embodiments, the terminal device 110 may determine the reference SFN based on a frame in which the DRX configuration is received. For example, the terminal device 110 may determine, as the reference SFN, a SFN of the frame in which the DRX configuration is received. As another example, the terminal device 110 may determine, as the reference SFN, a SFN of a frame later than the frame in which the DRX configuration is received by a predetermined number of frames. The predetermined number may be any positive integer.

In some embodiments, the terminal device 110 may determine a starting time of a DRX cycle based on a reference subframe number, the length, the slot offset, an index of the DRX cycle, a SFN and a subframe number associated with the DRX cycle. For example, the terminal device 110 may determine the starting time based on equation (19) below.

$$Ns = [S2 + \text{floor}(N * P)] \text{ modulo } 10240 \tag{19}$$

where S2 denotes the reference subframe number, floor( ) denotes a function of rounding down operation, N denotes an index of DRX cycle, P denotes the length of DRX cycle, and Ns is determined by the above equation (2). For the Nth DRX cycle, if the equation (19) is true, then the DRX cycle should be started after drx_SlotOffset from the beginning of the subframe.

In some embodiments, the terminal device 110 may receive information of the reference subframe number from the network device 120 and determine the reference subframe number based on the received information. In some embodiments, the terminal device 110 may determine the reference subframe number based on a subframe in which the DRX configuration is received. For example, the terminal device 110 may determine, as the reference subframe number, a subframe number of the subframe in which the DRX configuration is received. As another example, the terminal device 110 may determine, as the reference subframe number, a subframe number of a subframe later than the subframe in which the DRX configuration is received by a predetermined number of subframes. The predetermined number may be any positive integer.

With the solution of Embodiment 7, a starting time of DRX cycle may also be roughly aligned with arrival time of a packet without accumulated latency, wasted resource and additional signaling overhead. In addition, the SFN period boundary issue may be avoided.

So far, the determination of the set of starting times is described. Return to FIG. 3B, the terminal device 110 performs 313 a downlink channel monitoring based on the set of starting times.

Similarly, upon transmission of the DRX configuration, the network device 120 also determines 314 the set of starting times for the set of DRX cycles. The operations for the determination 314 are similar with the operations for the determination 312, and thus are not repeated here for concise. Upon determination of the set of starting times, the network device 120 performs 315 a downlink channel transmission.

With the process of FIG. 3B, a DRX cycle may also be roughly aligned with the periodicity of arrival time of a XR packet, and thus additional power consumption due to the misalignment may be avoided. No accumulated offset between DRX cycle and the packet arrival time, and thus it is avoided that the packet arrives at the time outside the on duration of the DRX cycle.

Example Implementation of Methods

Accordingly, embodiments of the present disclosure provide methods of communication implemented at a terminal device and a network device. These methods will be described below with reference to FIGS. 6 to 9.

Figure 6:
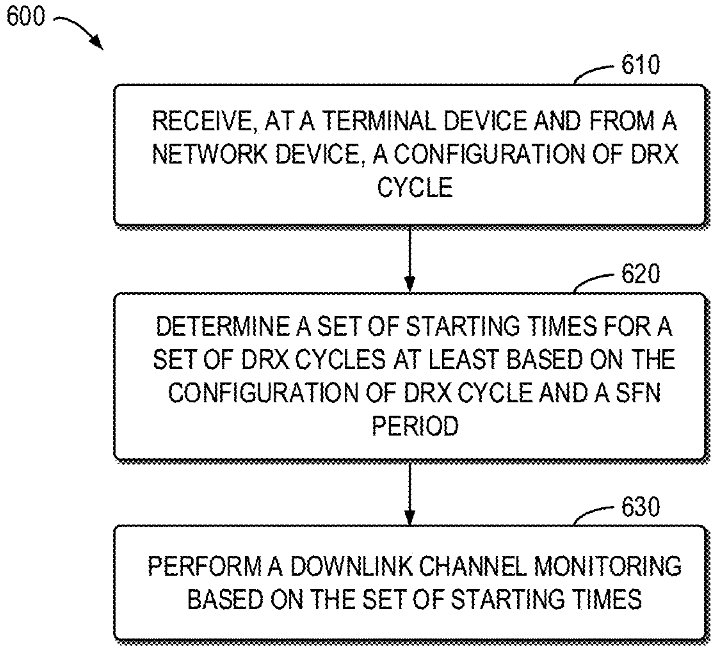
FIG. 6 illustrates an example method of communication implemented at a terminal device in accordance with some embodiments of the present disclosure.

FIG. 6 illustrates an example method 600 of communication implemented at a terminal device in accordance with some embodiments of the present disclosure. For example, the method 600 may be performed at the terminal device 110 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard.

At block 610, the terminal device 110 receives, from the network device 120, a configuration of DRX cycle. In some embodiments, the configuration may indicate a length of DRX cycle, a start offset for DRX cycle and a slot offset for DRX cycle. In these embodiments, the length of DRX cycle is a non-integer value.

At block 620, the terminal device 110 determines a set of starting times for a set of DRX cycles at least based on the configuration of DRX cycle and a SFN period, wherein the SFN period comprises multiple consecutive SFNs.

In some embodiments, the terminal device 110 may determine a first value based on an index of the SFN period, a SFN and a subframe number associated with the DRX cycle, and determine the starting time based on the first value, the length, the starting offset and the slot offset. For example, the terminal device 110 may determine the first value (Ns) based on the equation (5) and determine the starting time based on the equations (1) and (5). It is to be understood that any other suitable ways are also feasible.

In some embodiments, the terminal device 110 may determine a second value used for adjusting the start offset for the DRX cycle. In some embodiments, the terminal device 110 may determine the second value based on the length of DRX cycle. For example, the terminal device 110 may determine the second value (delta) based on the equation (10) or (11). It is to be understood that any other suitable ways are also feasible. In some embodiments, the terminal device 110 may receive a configuration of the second value from the network device 120, and determine the second value based on the configuration of the second value.

In some embodiments, at a starting or ending of the SFN period, the terminal device 110 may adjust the start offset based on the second value and the length of DRX cycle. For example, the terminal device 110 may adjust the start offset based on the equations (6) and (7). As another example, the terminal device 110 may adjust the start offset based on (8) or (9).

In some embodiments, the terminal device 110 may determine the starting time based on the adjusted start offset, the length of DRX cycle, the slot offset, a SFN and a subframe number associated with the DRX cycle. For example, the terminal device 110 may determine the starting time based on the equation (1).

In some embodiments, the starting time of the DRX cycle to be adjusted is later than a threshold time after the reception of the configuration of the second value. In some embodiments, the DRX cycle to be adjusted is the first DRX cycle in the SFN period.

At block 630, the terminal device 110 performs a downlink channel monitoring based on the set of starting times.

With the method of FIG. 6, a starting time of a DRX cycle may be roughly aligned with an arrive time of packets without the SFN period boundary issue.

Figure 7:
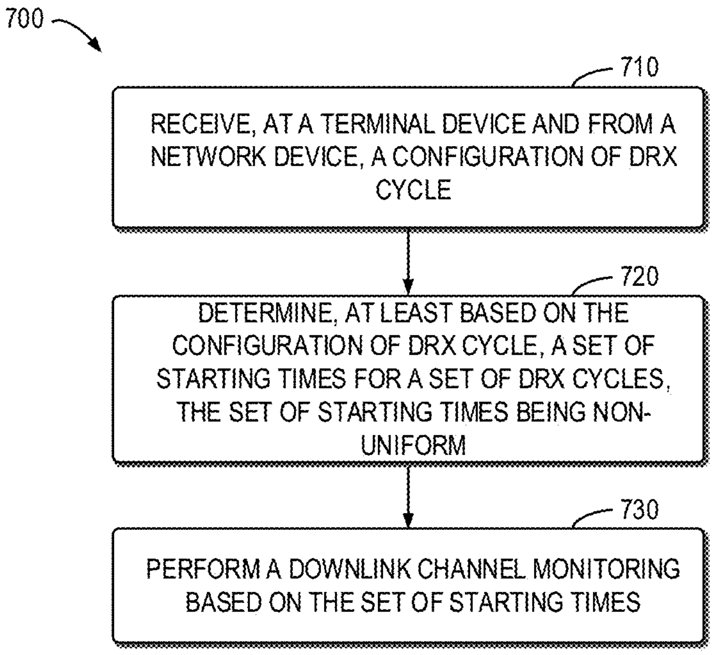
FIG. 7 illustrates another example method of communication implemented at a terminal device in accordance with some embodiments of the present disclosure.

FIG. 7 illustrates another example method 700 of communication implemented at a terminal device in accordance with some embodiments of the present disclosure. For example, the method 700 may be performed at the terminal device 110 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

As shown in FIG. 7, at block 710, the terminal device 110 receives, from the network device 120, a configuration of DRX cycle. In some embodiments, the configuration may indicate a length of DRX cycle, a start offset for DRX cycle and a slot offset for DRX cycle. In these embodiments, the length of DRX cycle is a non-integer value.

At block 720, the terminal device 110 determines, at least based on the configuration of DRX cycle, a set of starting times for a set of DRX cycles, the set of starting times being non-uniform. In some embodiments, the configuration may indicate a length of DRX cycle, a start offset for DRX cycle and a slot offset for DRX cycle, the length being an integer value.

In some embodiments, the terminal device 110 may determine, based on the configuration, a candidate set of starting times for the set of DRX cycles. For example, the terminal device 110 may determine the candidate set of starting times based on the equation (12) or (13).

In some embodiments, in response to receiving, from the network device 120, a first indication indicating that one or more starting times of one or more DRX cycles in the set of DRX cycles are to be modified, the terminal device 110 may modify, based on the first indication, the one or more starting times in the candidate set of starting times, and determine the modified candidate set of starting times as the set of starting times. In some embodiments, the first indication may comprise an offset with respect to the one or more starting times.

In some alternative embodiments, the terminal device 110 may determine an accumulated offset for a DRX cycle in the set of DRX cycles based on an index of the DRX cycle, the length of the DRX cycle and a time value associated with the configuration of DRX cycle. In some embodiments, the terminal device 110 may receive, from the network device 120, a second indication indicating the time value, the time value being a non-integer value. For example, the terminal device 110 may determine the accumulated offset based on the equation (14). Of course, any other suitable ways are also feasible.

Then the terminal device 110 may modify, based on the accumulated offset, a starting time of the DRX cycle in the candidate set of starting times, and determine the modified candidate set of starting times as the set of starting times. In some embodiments, if the accumulated offset is smaller than a threshold offset, the terminal device 110 may keep the starting time of the DRX cycle unchanged. If the accumulated offset is larger than the threshold offset, the terminal device 110 may modify the starting time based on the threshold offset. In some embodiments, the terminal device 110 may receive, from the network device 120, a third indication indicating the threshold offset. In some embodiments, the terminal device 110 may reset a counter to be zero after the modifying, the counter being configured for generating the index of the DRX cycle.

In some embodiments, the configuration may indicate a slot offset for DRX cycle, a start offset for DRX cycle and a DRX cycle pattern for the set of starting times, the DRX cycle pattern comprising a set of values, a value in the set of values indicating a length of DRX cycle. In these embodiments, the terminal device 110 may determine a third value in the set of values based on an index of the DRX cycle and the number of values in the set of values. For example, the terminal device 110 may determine the third value based on the equation (15) or (16). Of course, any other suitable ways are also feasible. Then the terminal device 110 may determine the starting time for the DRX cycle based on the third value, the start offset for the DRX cycle, the slot offset, a SFN and a subframe number associated with the DRX cycle. For example, the terminal device 110 may determine the starting time for the DRX cycle based on the equation (12) or (13).

In some embodiments, the configuration may indicate a slot offset for DRX cycle, a length of DRX cycle and a start offset pattern for the set of starting times, the start offset pattern comprising a set of values, a value in the set of values indicating a start offset for DRX cycle. In these embodiments, the terminal device 110 may determine a fourth value in the set of values based on an index of a subframe number associated with the DRX cycle, the length of the DRX cycle and the number of values in the set of values. For example, the terminal device 110 may determine the fourth value based on the equation (15) or (16). Any other suitable ways are also feasible. Then the terminal device 110 may determine the starting time for the DRX cycle based on the fourth value, the length of the DRX cycle, the slot offset, a SFN and the subframe number associated with the DRX cycle. For example, the terminal device 110 may determine the starting time for the DRX cycle based on the equation (12) or (13).

In some embodiments, the configuration may indicate a length of DRX cycle, a start offset for DRX cycle and a slot offset for DRX cycle. In some embodiments, the terminal device 110 may determine the starting time based on a reference SFN, the length, the start offset, the slot offset, an index of the DRX cycle, a SFN and a subframe number associated with the DRX cycle.

In some embodiments, the terminal device 110 may receive information of the reference SFN from the network device 120, and determine the reference SFN based on the received information. In some embodiments, the terminal device 110 may determine the reference SFN based on a frame in which the configuration is received.

In some embodiments, the terminal device 110 may determine the starting time based on a reference subframe number, the length, the start offset, the slot offset, an index of the DRX cycle a SFN and a subframe number associated with the DRX cycle. In some alternative embodiments, the terminal device 110 may determine the starting time based on a reference subframe number, the length, the slot offset, an index of the DRX cycle a SFN and a subframe number associated with the DRX cycle.

In some embodiments, the terminal device 110 may receive information of the reference subframe number from the network device 120, and determine the reference subframe number based on the received information. In some embodiments, the terminal device 110 may determine the reference subframe number based on a subframe in which the configuration is received.

At block 730, the terminal device 110 performs a downlink channel monitoring based on the set of starting times. With the method 700, a starting time of a DRX cycle may be roughly aligned with arrive time of packets.

Figure 8:
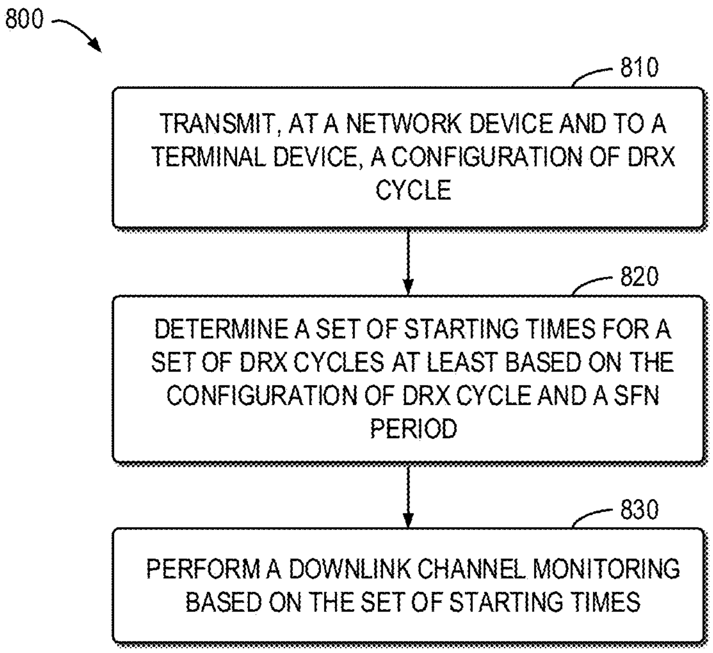
FIG. 8 illustrates an example method of communication implemented at a network device in accordance with some embodiments of the present disclosure.

FIG. 8 illustrates an example method 800 of communication implemented at a network device in accordance with some embodiments of the present disclosure. For example, the method 800 may be performed at the network device 120 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard.

At block 810, the network device 120 transmits, to the terminal device 110, a configuration of DRX cycle. In some embodiments, the configuration may indicate a length of DRX cycle, a start offset for DRX cycle and a slot offset for DRX cycle. In these embodiments, the length of DRX cycle is a non-integer value.

At block 820, the network device 120 determines a set of starting times for a set of DRX cycles at least based on the configuration of DRX cycle and a SFN period, wherein the SFN period comprises multiple consecutive SFNs.

In some embodiments, the network device 120 may determine a first value based on an index of the SFN period, a SFN and a subframe number associated with the DRX cycle, and determine the starting time based on the first value, the length, the starting offset and the slot offset. In some embodiments, the network device 120 may determine a second value used for adjusting the start offset for the DRX cycle. In some embodiments, the network device 120 may determine the second value based on the length of DRX cycle. It is to be understood that any other suitable ways are also feasible. In some embodiments, the network device 120 may transmit a configuration of the second value to the terminal device 110.

In some embodiments, at a starting or ending of the SFN period, the network device 120 may adjust the start offset based on the second value and the length of DRX cycle. In some embodiments, the network device 120 may determine the starting time based on the adjusted start offset, the length of DRX cycle, the slot offset, a SFN and a subframe number associated with the DRX cycle.

In some embodiments, the starting time of the DRX cycle to be adjusted is later than a threshold time after the reception of the configuration of the second value. In some embodiments, the DRX cycle to be adjusted is the first DRX cycle in the SFN period.

At block 830, the network device 120 performs a downlink transmission based on the set of starting times. With the method of FIG. 8, a starting time of a DRX cycle may be roughly aligned with arrive time of packets without the SFN period boundary issue.

Figure 9:
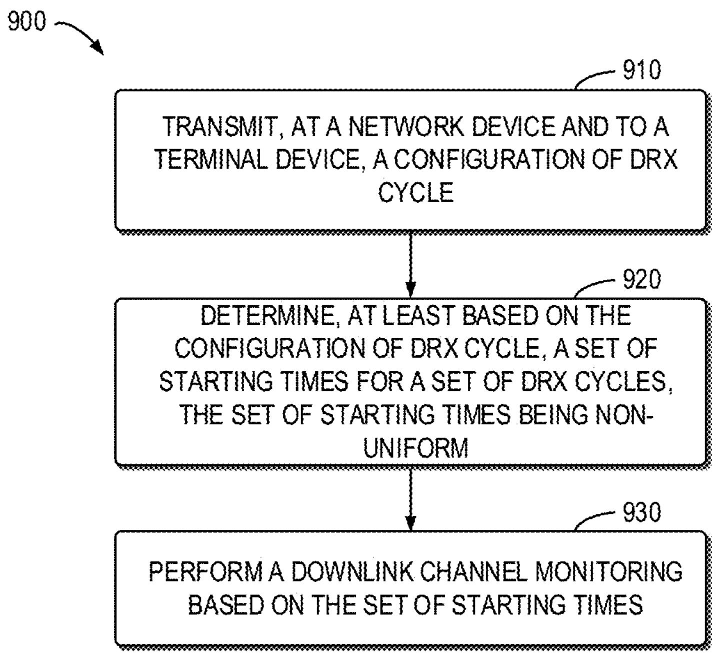
FIG. 9 illustrates another example method of communication implemented at a network device in accordance with some embodiments of the present disclosure.

FIG. 9 illustrates another example method 900 of communication implemented at a network device in accordance with some embodiments of the present disclosure. For example, the method 900 may be performed at the network device 120 as shown in FIG. 1. For the purpose of discussion, in the following, the method 900 will be described with reference to FIG. 1. It is to be understood that the method 900 may include additional blocks not shown and/or may omit some blocks as shown, and the scope of the present disclosure is not limited in this regard.

As shown in FIG. 9, at block 910, the network device 120 transmits, to the terminal device 110, a configuration of DRX cycle. In some embodiments, the configuration may indicate a length of DRX cycle, a start offset for DRX cycle and a slot offset for DRX cycle. In these embodiments, the length of DRX cycle is a non-integer value.

At block 920, the network device 120 determines, at least based on the configuration of DRX cycle, a set of starting times for a set of DRX cycles, the set of starting times being non-uniform. In some embodiments, the configuration may indicate a length of DRX cycle, a start offset for DRX cycle and a slot offset for DRX cycle, the length being an integer value.

In some embodiments, the network device 120 may determine, based on the configuration, a candidate set of starting times for the set of DRX cycles. The network device 120 may determine the set of starting times by modifying one or more starting times in the candidate set of starting times, and transmit, to the terminal device 110, a first indication indicating that the one or more starting times of one or more DRX cycles in the set of DRX cycles is to be modified. In some embodiments, the first indication may comprise an offset with respect to the one or more starting times.

In some alternative embodiments, the network device 120 may determine an accumulated offset for a DRX cycle in the set of DRX cycles based on an index of the DRX cycle, the length of the DRX cycle and a time value associated with the configuration of DRX cycle. Then the terminal device 110 may modify, based on the accumulated offset, a starting time of the DRX cycle in the candidate set of starting times, and determine the modified candidate set of starting times as the set of starting times. In some embodiments, if the accumulated offset is smaller than a threshold offset, the network device 120 may keep the starting time of the DRX cycle unchanged. If the accumulated offset is larger than the threshold offset, the network device 120 may modify the starting time based on the threshold offset. In some embodiments, the network device 120 may transmit, to the terminal device 110, a third indication indicating the threshold offset. In some embodiments, the network device 120 may reset a counter to be zero after the modifying, the counter being configured for generating the index of the DRX cycle.

In some embodiments, the configuration may indicate a slot offset for DRX cycle, a start offset for DRX cycle and a DRX cycle pattern for the set of starting times, the DRX cycle pattern comprising a set of values, a value in the set of values indicating a length of DRX cycle. In these embodiments, the network device 120 may determine a third value in the set of values based on an index of the DRX cycle and the number of values in the set of values. Then the network device 120 may determine the starting time for the DRX cycle based on the third value, the start offset for the DRX cycle, the slot offset, a SFN and a subframe number associated with the DRX cycle.

In some embodiments, the configuration may indicate a slot offset for DRX cycle, a length of DRX cycle and a start offset pattern for the set of starting times, the start offset pattern comprising a set of values, a value in the set of values indicating a start offset for DRX cycle. In these embodiments, the network device 120 may determine a fourth value in the set of values based on an index of a subframe number associated with the DRX cycle, the length of the DRX cycle and the number of values in the set of values. Then the network device 120 may determine the starting time for the DRX cycle based on the fourth value, the length of the DRX cycle, the slot offset, a SFN and the subframe number associated with the DRX cycle.

In some embodiments, the configuration may indicate a length of DRX cycle, a start offset for DRX cycle and a slot offset for DRX cycle. In some embodiments, the terminal device 110 may determine the starting time based on a reference SFN, the length, the start offset, the slot offset, an index of the DRX cycle, a SFN and a subframe number associated with the DRX cycle.

In some embodiments, the network device 120 may transmit information of the reference SFN to the terminal device 110. In some embodiments, the network device 120 may determine the reference SFN based on a frame in which the configuration is received.

In some embodiments, the network device 120 may determine the starting time based on a reference subframe number, the length, the start offset, the slot offset, an index of the DRX cycle a SFN and a subframe number associated with the DRX cycle. In some alternative embodiments, the network device 120 may determine the starting time based on a reference subframe number, the length, the slot offset, an index of the DRX cycle a SFN and a subframe number associated with the DRX cycle.

In some embodiments, the network device 120 may transmit information of the reference subframe number to the terminal device 110. In some embodiments, the network device 120 may determine the reference subframe number based on a subframe in which the configuration is received.

At block 930, the network device 120 performs a downlink channel monitoring based on the set of starting times. With the method 900, a starting time of a DRX cycle may be roughly aligned with arrive time of packets.

Example Implementation of Devices

Figure 10:
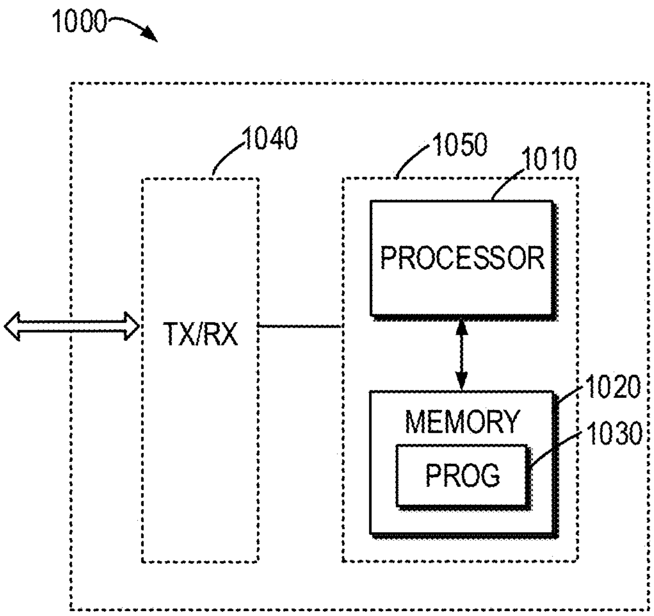
FIG. 10 is a simplified block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of the terminal device 110 or the network device 120 as shown in FIG. 1. Accordingly, the device 1000 can be implemented at or as at least a part of the terminal device 110 or the network device 120.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1010 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 1030 is assumed to include program instructions that, when executed by the associated processor 1010, enable the device 1000 to operate in accordance with the embodiments of the present disclosure, as discussed herein with reference to FIGS. 3A to 9. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1020 may form processing means 1050 adapted to implement various embodiments of the present disclosure.

The memory 1020 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1020 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

In some embodiments, a terminal device comprises circuitry configured to: receive, from a network device, a configuration of DRX cycle; determine a set of starting times for a set of DRX cycles at least based on the configuration of DRX cycle and a SFN period, wherein the SFN period comprises multiple consecutive SFNs; and perform a downlink channel monitoring based on the set of starting times.

In some embodiments, the configuration indicates a length of DRX cycle, a start offset for DRX cycle and a slot offset for DRX cycle, the length being a non-integer value.

In some embodiments, the circuitry may be configured to determine a starting time for a DRX cycle in the set of DRX cycles by: determining a first value based on an index of the SFN period, a SFN and a subframe number associated with the DRX cycle; and determining the starting time based on the first value, the length, the starting offset and the slot offset.

In some embodiments, the circuitry may be configured to determine a starting time for a DRX cycle in the set of DRX cycles by: determining a second value used for adjusting the start offset for the DRX cycle; adjusting, at a starting or ending of the SFN period, the start offset based on the second value and the length of DRX cycle; and determining the starting time based on the adjusted start offset, the length of DRX cycle, the slot offset, a SFN and a subframe number associated with the DRX cycle.

In some embodiments, the circuitry may be configured to determine the second value by determining the second value based on the length of DRX cycle. In some embodiments, the circuitry may be configured to determine the second value by: receiving a configuration of the second value from the network device; and determining the second value based on the configuration of the second value.

In some embodiments, the starting time of the DRX cycle is later than a threshold time after the reception of the configuration of the second value. In some embodiments, the DRX cycle is the first DRX cycle in the SFN period.

In some embodiments, a terminal device comprises circuitry configured to: receive, from a network device, a configuration of DRX cycle; determine, at least based on the configuration of DRX cycle, a set of starting times for a set of DRX cycles, the set of starting times being non-uniform; and perform a downlink channel monitoring based on the set of starting times.

In some embodiments, the configuration indicates a length of DRX cycle, a start offset for DRX cycle and a slot offset for DRX cycle, the length being an integer value.

In some embodiments, the circuitry may be configured to determine the set of starting times by: determining, based on the configuration, a candidate set of starting times for the set of DRX cycles; in response to receiving, from the network device, a first indication indicating that one or more starting times of one or more DRX cycles in the set of DRX cycles are to be modified, modifying, based on the first indication, the one or more starting times in the candidate set of starting times; and determining the modified candidate set of starting times as the set of starting times. In some embodiments, the first indication comprises an offset with respect to the one or more starting times.

In some embodiments, the circuitry may be configured to determine the set of starting times by: determining, based on the configuration, a candidate set of starting times for the set of DRX cycles; determining an accumulated offset for a DRX cycle in the set of DRX cycles based on an index of the DRX cycle, the length of the DRX cycle and a time value associated with the configuration of DRX cycle; modifying, based on the accumulated offset, a starting time of the DRX cycle in the candidate set of starting times; and determining the modified candidate set of starting times as the set of starting times.

In some embodiments, the circuitry may be further configured to receive, from the network device, a second indication indicating the time value, the time value being a non-integer value.

In some embodiments, the circuitry may be configured to modify the starting time by: in accordance with a determination that the accumulated offset is smaller than a threshold offset, keeping the starting time of the DRX cycle unchanged; and in accordance with a determination that the accumulated offset is larger than the threshold offset, modifying the starting time based on the threshold offset.

In some embodiments, the circuitry may be further configured to receive, from the network device, a third indication indicating the threshold offset. In some embodiments, the circuitry may be further configured to reset a counter to be zero after the modifying, the counter being configured for generating the index of the DRX cycle.

In some embodiments, the configuration indicates a slot offset for DRX cycle, a start offset for DRX cycle and a DRX cycle pattern for the set of starting times, the DRX cycle pattern comprising a set of values, a value in the set of values indicating a length of DRX cycle. In some embodiments, the circuitry may be configured to determine a starting time for a DRX cycle in the set of DRX cycles by: determining a third value in the set of values based on an index of the DRX cycle and the number of values in the set of values; and determining the starting time for the DRX cycle based on the third value, the start offset for the DRX cycle, the slot offset, a SFN and a subframe number associated with the DRX cycle.

In some embodiments, the configuration indicates a slot offset for DRX cycle, a length of DRX cycle and a start offset pattern for the set of starting times, the start offset pattern comprising a set of values, a value in the set of values indicating a start offset for DRX cycle.

In some embodiments, the circuitry may be configured to determine a starting time for a DRX cycle in the set of DRX cycles by: determining a fourth value in the set of values based on an index of a subframe number associated with the DRX cycle, the length of the DRX cycle and the number of values in the set of values; and determining the starting time for the DRX cycle based on the fourth value, the length of the DRX cycle, the slot offset, a SFN and the subframe number associated with the DRX cycle.

In some embodiments, the configuration indicates a length of DRX cycle, a start offset for DRX cycle and a slot offset for DRX cycle.

In some embodiments, the circuitry may be configured to determine a starting time for a DRX cycle in the set of DRX cycles by: determining the starting time based on a reference SFN, the length, the start offset, the slot offset, an index of the DRX cycle, a SFN and a subframe number associated with the DRX cycle.

In some embodiments, the circuitry may be further configured to: receive information of the reference SFN from the network device; and determine the reference SFN based on the received information.

In some embodiments, the circuitry may be further configured to determine the reference SFN based on a frame in which the configuration is received.

In some embodiments, the circuitry may be configured to determine a starting time for a DRX cycle in the set of DRX cycles by: determining the starting time based on a reference subframe number, the length, the start offset, an index of the DRX cycle a SFN and a subframe number associated with the DRX cycle.

In some embodiments, the circuitry may be configured to determine a starting time for a DRX cycle in the set of DRX cycles by: determining the starting time based on a reference subframe number, the length, the slot offset, an index of the DRX cycle, a SFN and a subframe number associated with the DRX cycle.

In some embodiments, the circuitry may be further configured to: receive information of the reference subframe number from the network device; and determine the reference subframe number based on the received information.

In some embodiments, the circuitry may be further configured to determine the reference subframe number based on a subframe in which the configuration is received.

In some embodiments, a network device comprise a circuitry configured to: transmit, to a terminal device, a configuration of DRX cycle; determine a set of starting times for a set of DRX cycles at least based on the configuration of DRX cycle and a SFN period, wherein the SFN period comprises multiple consecutive SFNs; and perform a downlink transmission based on the set of starting times.

In some embodiments, the configuration indicates a length of DRX cycle, a start offset for DRX cycle and a slot offset for DRX cycle, the length being a non-integer value.

In some embodiments, the circuitry may be configured to determine a starting time for a DRX cycle in the set of DRX cycles by: determining a first value based on an index of the SFN period, a SFN and a subframe number associated with the DRX cycle; and determining the starting time based on the first value, the length, the starting offset and the slot offset.

In some embodiments, the circuitry may be configured to determine a starting time for a DRX cycle in the set of DRX cycles by: determining a second value used for adjusting the start offset for the DRX cycle; adjusting, at a starting or ending of the SFN period, the start offset based on the second value and the length of the DRX cycle; and determining the starting time based on the adjusted start offset, the length of DRX cycle, the slot offset, a SFN and a subframe number associated with the DRX cycle.

In some embodiments, the circuitry may be configured to determine the second value by determining the second value based on the length of DRX cycle. In some embodiments, the circuitry may be further configured to transmit a configuration of the second value to the terminal device. In some embodiments, the starting time of the DRX cycle is later than a threshold time after the reception of the configuration of the second value. In some embodiments, the DRX cycle is the first DRX cycle in the SFN period.

In some embodiments, a network device comprises a circuitry configured to: transmit, from a network device and to a terminal device, a configuration of DRX cycle; determine, at least based on the configuration of DRX cycle, a set of starting times for a set of DRX cycles, the set of starting times being non-uniform; and perform a downlink transmission based on the set of starting times.

In some embodiments, the configuration indicates a length of DRX cycle, a start offset for DRX cycle and a slot offset for DRX cycle, the length being an integer value.

In some embodiments, the circuitry may be configured to determine the set of starting times by: determining, based on the configuration, a candidate set of starting times for the set of DRX cycles; determining the set of starting times by modifying one or more starting times in the candidate set of starting times; and transmitting, to the terminal device, a first indication indicating that the one or more starting times of one or more DRX cycles in the set of DRX cycles is to be modified. In some embodiments, the first indication comprises an offset with respect to the one or more starting times.

In some embodiments, the circuitry may be configured to determine the set of starting times by: determining, based on the configuration, a candidate set of starting times for the set of DRX cycles; determining an accumulated offset for a DRX cycle in the set of DRX cycles based on an index of the DRX cycle, the length of the DRX cycle and a time value associated with the configuration of DRX cycle; modifying, based on the accumulated offset, a starting time of the DRX cycle in the candidate set of starting times; and determining the modified candidate set of starting times as the set of starting times.

In some embodiments, the circuitry may be further configured to: transmit, to the terminal device, a second indication indicating the time value, the time value being a non-integer value.

In some embodiments, the circuitry may be configured to modify the starting time by: in accordance with a determination that the accumulated offset is smaller than a threshold offset, keeping the starting time of the DRX cycle unchanged; and in accordance with a determination that the accumulated offset is larger than the threshold offset, modifying the starting time based on the threshold offset.

In some embodiments, the circuitry may be further configured to transmit, to the terminal device, a third indication indicating the threshold offset. In some embodiments, the circuitry may be further configured to reset a counter to be zero after the modifying, the counter being configured for generating the index of the DRX cycle.

In some embodiments, the configuration indicates a slot offset for DRX cycle, a start offset for DRX cycle and a DRX cycle pattern for the set of starting times, the DRX cycle pattern comprising a set of values, a value in the set of values indicating a length of DRX cycle. In some embodiments, the circuitry may be further configured to determine a starting time for a DRX cycle in the set of DRX cycles by: determining a third value in the set of values based on an index of the DRX cycle and the number of values in the set of values; and determining the starting time for the DRX cycle based on the third value, the start offset for the DRX cycle, the slot offset, a SFN and a subframe number associated with the DRX cycle.

In some embodiments, the configuration indicates a slot offset for DRX cycle, a length of DRX cycle and a start offset pattern for the set of starting times, the start offset pattern comprising a set of values, a value in the set of values indicating a start offset for DRX cycle. In some embodiments, the circuitry may be configured to determine a starting time for a DRX cycle in the set of DRX cycles by: determining a fourth value in the set of values based on an index of a subframe number associated with the DRX cycle, the length of the DRX cycle and the number of values in the set of values; and determining the starting time for the DRX cycle based on the second value, the length of the DRX cycle, the slot offset, a SFN and the subframe number associated with the DRX cycle.

In some embodiments, the configuration indicates a length of DRX cycle, a start offset for DRX cycle and a slot offset for DRX cycle. In some embodiments, the circuitry may be configured to determine a starting time for a DRX cycle in the set of DRX cycles by determining the starting time based on a reference system frame number (SFN), the length, the start offset, the slot offset, an index of the DRX cycle, a SFN and a subframe number associated with the DRX cycle.

In some embodiments, the circuitry may be further configured to transmit information of the reference SFN to the terminal device. In some embodiments, the circuitry may be further configured to determine the reference SFN based on a frame in which the configuration is transmitted.

In some embodiments, the circuitry may be configured to determine a starting time for a DRX cycle in the set of DRX cycles by determining the starting time based on a reference subframe number, the length, the start offset, an index of the DRX cycle a SFN and a subframe number associated with the DRX cycle.

In some embodiments, the circuitry may be configured to determine a starting time for a DRX cycle in the set of DRX cycles by determining the starting time based on a reference subframe number, the length, the slot offset, an index of the DRX cycle, a SFN and a subframe number associated with the DRX cycle.

In some embodiments, the circuitry may be further configured to transmit information of the reference subframe number to the terminal device. In some embodiments, the circuitry may be further configured to determine the reference subframe number based on a subframe in which the configuration is transmitted.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3A to 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of a User Equipment (UE), the method comprising:

receiving, from a network, a Radio Resource Control (RRC) message which includes a Discontinuous Reception (DRX) configuration, wherein the DRX configuration includes a DRX on-duration timer and a DRX slot offset, and wherein the DRX configuration is configured to include a non-integer DRX cycle; and monitoring a Physical Downlink Control Channel (PDCCH) discontinuously using a DRX operation, in which the UE is configured to start the DRX on-duration timer after the DRX slot offset in a case where the non-integer DRX cycle is configured and a first equation is true, wherein the first equation includes a first value, and wherein the first value is a sum of 10240 times of a DRX System Frame Number (SFN) counter, 10 times of an SFN, and a subframe number.

2. The method according to claim 1, wherein a left side of the first equation includes a floor of the first value and a modulo of the non-integer DRX cycle.

3. The method according to claim 1, wherein the DRX configuration includes a DRX start offset, and wherein a right side of the first equation includes a floor of a sum of a second value and the DRX start offset and a modulo of the non-integer DRX cycle.

4. The method according to claim 1, wherein the UE is configured to increment the DRX SFN counter by 1 in a first symbol of a slot in which the SFN changes to 0 in a case where the non-integer DRX cycle is configured.

5. The method according to claim 1, wherein the UE is configured to set the DRX SFN counter to 0 when a DRX is configured or re-configured in a case where the non-integer DRX cycle is configured.

6. The method according to claim 1, wherein the non-integer DRX cycle is a long DRX cycle.

7. The method according to claim 1, wherein the non-integer DRX cycle is a short DRX cycle.

8. A User Equipment (UE) comprising:

a memory; and a processor coupled with the memory, wherein the processor is configured to:

receive, from a network, a Radio Resource Control (RRC) message which includes a Discontinuous Reception (DRX) configuration, wherein the DRX configuration includes a DRX on-duration timer and a DRX slot offset, and wherein the DRX configuration is configured to include a non-integer DRX cycle, and monitor a Physical Downlink Control Channel (PDCCH) discontinuously using a DRX operation, in which the UE is configured to start the DRX on-duration timer after the DRX slot offset in a case where the non-integer DRX cycle is configured and a first equation is true, wherein the first equation includes a first value, and wherein the first value is a sum of 10240 times of a DRX System Frame Number (SFN) counter, 10 times of an SFN, and a subframe number.

9. The UE according to claim 8, wherein a left side of the first equation includes a floor of the first value and a modulo of the non-integer DRX cycle.

10. The UE according to claim 8, wherein the DRX configuration includes a DRX start offset, and wherein a right side of the first equation includes a floor of a sum of a second value and the DRX start offset and a modulo of the non-integer DRX cycle.

11. The UE according to claim 8, wherein the UE is configured to increment the DRX SFN counter by 1 in a first symbol of a slot in which the SFN changes to 0 in a case where the non-integer DRX cycle is configured.

12. The UE according to claim 8, wherein the UE is configured to set the DRX SFN counter to 0 when a DRX is configured or re-configured in a case where the non-integer DRX cycle is configured.

13. The UE according to claim 8, wherein the non-integer DRX cycle is a long DRX cycle.

14. The UE according to claim 8, wherein the non-integer DRX cycle is a short DRX cycle.

* * * * *